United States Patent [19]

Russell, Jr.

[11] Patent Number: 4,890,322
[45] Date of Patent: Dec. 26, 1989

[54] METHOD AND APPARATUS FOR SUBSCRIPTION BROADCAST

[75] Inventor: Thomas L. Russell, Jr., Colts Neck, N.J.

[73] Assignees: American Telephone and Telegraph Company, New York, N.Y.; AT&T Bell Laboratories, Murray Hill, N.J.

[21] Appl. No.: 235,723

[22] Filed: Aug. 17, 1988

Related U.S. Application Data

[63] Continuation of Ser. No. 582,966, Feb. 23, 1984, abandoned.

[51] Int. Cl.⁴ .......................... H04N 7/167; H04H 1/00
[52] U.S. Cl. ........................................ 380/20; 358/86; 379/93; 455/5
[58] Field of Search ............... 380/10, 20; 358/84–86; 455/2, 5; 379/93

[56] References Cited

U.S. PATENT DOCUMENTS

| | | | |
|---|---|---|---|
| Re. 31,735 | 11/1984 | Davidson | 380/20 X |
| 2,510,046 | 5/1950 | Ellett et al. | 380/20 X |
| 3,703,684 | 11/1972 | McVoy | 179/2 AS |
| 3,886,302 | 5/1975 | Kosco | 380/20 |
| 3,911,204 | 10/1975 | Spinelli | 178/5.1 |
| 3,914,534 | 10/1975 | Forbes | 380/20 X |
| 4,008,369 | 2/1977 | Theurer et al. | 358/84 |
| 4,115,807 | 9/1978 | Pires | 358/122 |
| 4,163,254 | 7/1979 | Block et al. | 358/122 |
| 4,163,255 | 7/1979 | Pires | 358/122 |
| 4,205,203 | 5/1980 | Barrett | 358/114 |
| 4,225,884 | 9/1980 | Block et al. | 358/122 |
| 4,325,078 | 4/1982 | Seaton et al. | 358/117 |
| 4,354,201 | 10/1982 | Sechet et al. | 356/351 |
| 4,369,462 | 1/1983 | Tomizawa et al. | 358/124 |
| 4,378,470 | 3/1983 | Murto et al. | 379/97 |
| 4,388,643 | 6/1983 | Aminetzah | 380/20 |
| 4,390,898 | 6/1983 | Bond et al. | 380/20 X |
| 4,456,925 | 6/1984 | Skerlos et al. | 358/85 |
| 4,531,020 | 7/1985 | Wechselberger et al. | 380/20 |
| 4,536,791 | 8/1985 | Campbell et al. | 380/10 |
| 4,584,602 | 4/1986 | Nakagawa | 358/84 X |
| 4,599,647 | 7/1986 | George et al. | 380/20 X |

OTHER PUBLICATIONS

*The Bell System Technical Journal*, Jul.-Aug. 1981, vol. 60, No. 6, Part 2.

Primary Examiner—Stephen C. Buczinski
Assistant Examiner—Linda J. Wallace
Attorney, Agent, or Firm—Frederick B. Luludis

[57] ABSTRACT

The system (10) provides a way of utilizing announcement distribution service equipment (21) which is presently in use in telecommunications networks (20) for ordering television or other signals (23) on a per program basis. The program signals (23) are enciphered. The receiver (30) is connected to receive a deciphered signal from a subscriber deciphering unit (18) at a subscriber location. The subscriber unit (18) is connected to the telecommunications network (20) by a nondedicated telephone service line (28). In response to an order instruction by the subscriber, the unit (18) automatically calls the appropriate announcement distribution service number for the channel associated with the desired program signal and receives from the service the coded key information (58) necessary for it to decipher the program signal. When the program signal is received by the unit (18), it is accompanied by control signals during retrace intervals which activate deciphering circuitry (G) in the unit. Also disclosed is a method of operation for the system (10) and a subscriber deciphering unit (18) for use in the system (10).

11 Claims, 4 Drawing Sheets

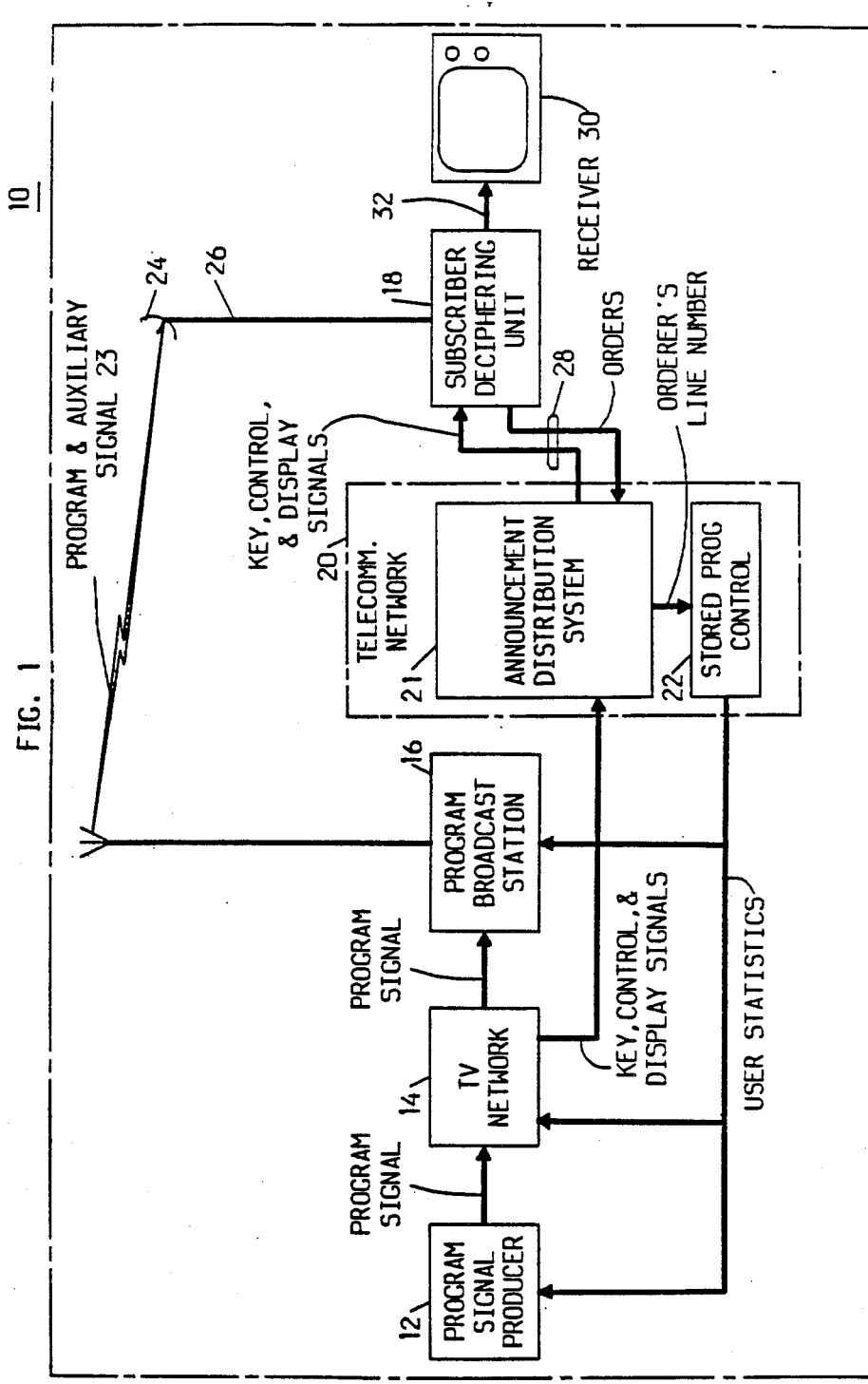

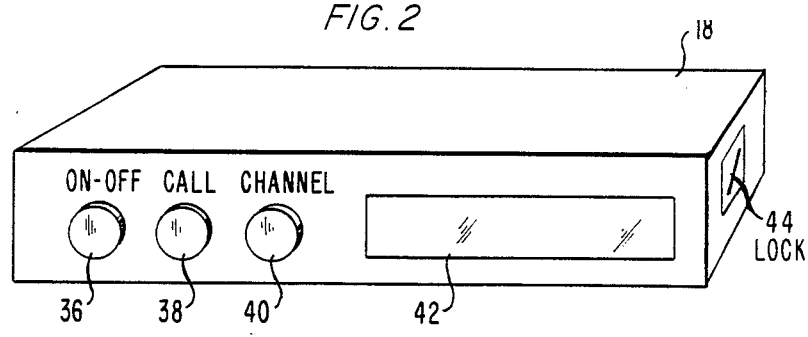
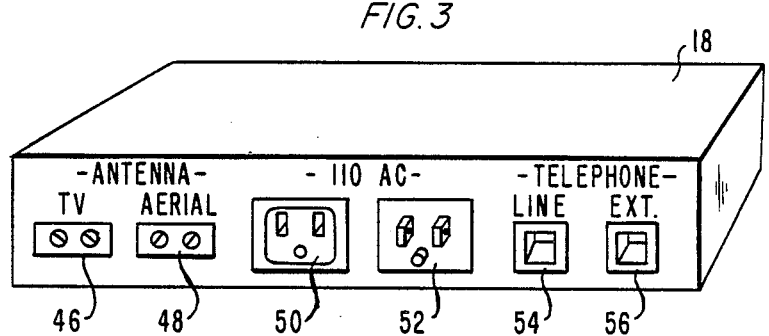
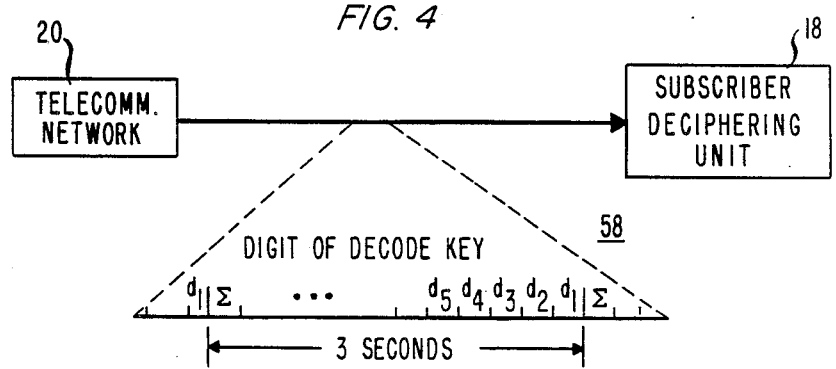

METHOD AND APPARATUS FOR SUBSCRIPTION BROADCAST

This application is a continuation of application Ser. No. 582,966 filed Feb. 23, 1984, now abandoned.

TECHNICAL FIELD

The invention relates to the distribution of signals, particularly radio or television signals, in such a way that there is control over their use, such as is the case for so-called "pay television."

While commercially broadcast television signals have generally been available to whomever wishes to receive them, there are other signals which are made available only to members of a restricted subscriber group. Sometimes the subscriber has a choice of ordering or not ordering a particular signal for a given time period. If he does order and he receives it, he becomes a "user."

Although there may be a number of variations in systems for distributing a signal on a per program basis, the following description applies to a typical system. The program signal is generated by a program "producer" entity and transferred to a distributor, which offers it to subscribers via cable on an order basis. The program signal is enciphered. Control of its use is afforded by controlling the availability of a key for its deciphering. The subscriber is supplied with a subscriber unit which incorporates the deciphering equipment and deciphers the signal of a selected channel for the receiving equipment. The subscriber unit may also require the delivery of deciphering key information before it can perform the deciphering.

The ordering of the program signal by a subscriber may be on an annual, monthly or shorter term basis. It may also be on a "per program" basis. A control unit at a remote location can supply the subscriber unit with a deciphering key for specific ordered programs. Systems of this type are described, for example, in the following U.S. Pat. Nos.

4,008,369 issued February 15, 1977 to D. L. Theurer et al. U.S. C. 358/8

4,115,807 issued September 19, 1978 to H. G. Pires U.S. Cl. 358/122

4,325,078 issued April 13, 1982 to J. C. Seaton et al. U.S. Cl. 358/117

4,354,201 issued October 12, 1982 to C. Sechet et al. U.S. Class 358/122

4,369,462 issued Jannuary 18, 1983 to S. A. Tomizawa et al. U.S. Class 358/124

The collection of user statistics, i.e. the number of orders for a program and the identities or the orderes for billing purposes, presents some difficulties with present subscriber systems. If the billing is not done frequently enough, the number of uncollectible subscriber accounts may become unacceptably high. On the other hand, if the billing is done too often, the cost of mailing the bills becomes excessive. For billing and other purposes, it would be desirable to have an indication of the actual number of users for a given program.

Signal theft is another difficulty with present subscriber systems. It is often possible for either subscribers who have not ordered a program signal or for nonsubscribers with access to the enciphered signal to find a way to decipher the signal independently or to fraudulently cause the control unit to supply the deciphering key to the subscriber unit. This cannot normally be detected and is at the present time thought to be a relatively wide-spread and persistent problem.

Another problem with present per program subscriber systems is their inability to provide the program producers with an independent means of measuring the audience sizes for those programs in which they have a financial interest.

The final, and perhaps most significant problem with per program ordering systems is that arising from impulse buying. It appears to be in the human nature of subscribers to decide shortly before a program offering to order the program signal. This is likely to completely overwhelm the equipment for accepting and recording program orders where the offered program is of great interest to a large number of subscribers. The capacity of the order-taking equipment then becomes a constraint on the sales of the program signal.

SUMMARY OF THE INVENTION

In accordance with the novel method and apparatus of the present invention, a program signal desired by a subscriber is automatically ordered by a subscriber unit which has received an order command as a result of the subscriber operating an order switch on the unit. The ordering is done over a telephone line. In response to the order, the subscriber unit receives key deciphering information over the same telephone line and stores it in a memory. The ordered enciphered program signal carries with it auxiliary signals including a control signal which activates the deciphering means in the unit to use the key information for deciphering the signal for the duration of the program. The subscriber unit in accordance with the invention includes means for automatically placing a program order over a telephone line and means for storing deciphering key information received over the telephone line in response to the order. It also includes means responsive to control signals accompanying a program signal for activating the means for deciphering the program signal. The unit may further be provided with a display for other information which is supplied with the key information or by the auxiliary signal.

BRIEF DESCRIPTION OF THE DRAWINGS

FIG. 1 is a partially pictorial flow chart illustrating the interaction of various elements of a per program subscription system in accordance with a preferred embodiment of the present invention.

FIG. 2 is a front, elevational, perspective view of one embodiment of a subscriber unit of the system of FIG. 1 for deciphering the program signal for use by receiver equipment with which it is associated.

FIG. 3 is a rear, elevational perspective view of the subscriber unit of FIG. 2.

FIG. 4 is a schematic graphical representation of the information content of a deciphering key which is transmitted to the subscriber unit of FIGS. 1-3 in response to an order.

DETAILED DESCRIPTION

Figure 5:
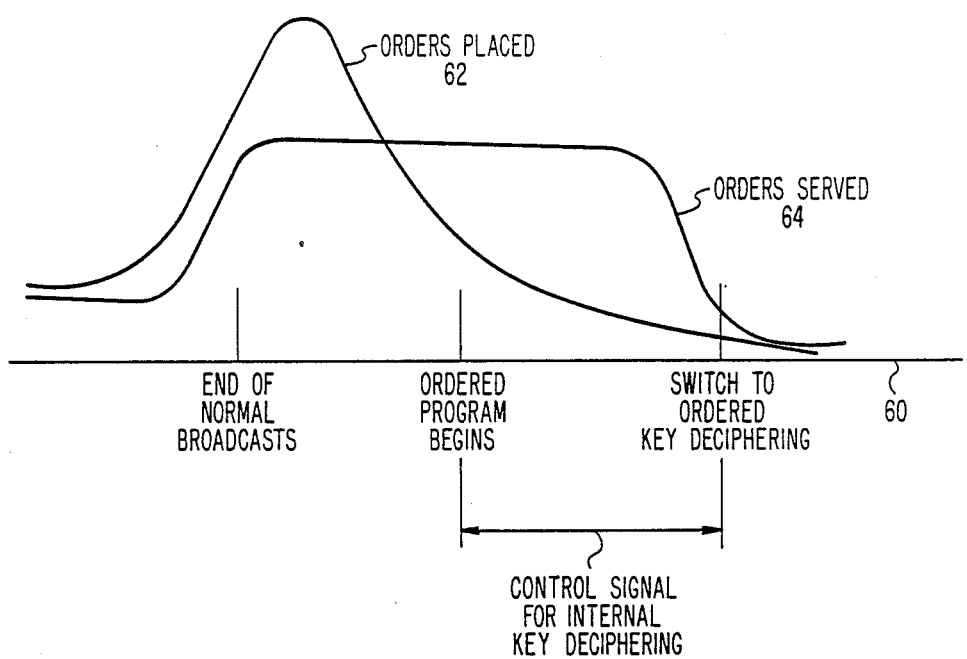
FIG. 5 is an exaggerated graphical representation of the frequencies of orders placed as compared to the orders served for program signals of the system of FIG. 1.

One example of a system in accordance with the present invention is the per program television subscription system 10 shown in FIG. 1 of the drawings. In the system 10, a program producer 12, a TV network 14, a broadcast station 16, and a program signal deciphering and control subscriber unit 18 are all interconnected by means of a telecommunications network 20. The telecommunications network 20 features an announcement distribution system 21, a feature which is now commonly identified as a "900 Service" because at the present time in the United States any access to the service is most likely to require dialing "900" as the first three digits of the telephone number which is identified with the particular announcement service in question. The announcement distribution system 21 is controlled by a stored program control system 22. The apparatus required for providing such a service in a telephone network, as well as the details of its operation, are well known in the art of telephony and are described, for example, in the *Bell System Technical Journal*, July-August 1981, Vol. 60, no. 6, part 2. An announcement distribution system of this type has the capability of accepting a large number of incoming order calls for various announcement services and automatically responding to the individual calls with a predetermined message.

In current "900 Service" applications, it is most frequently the case that the message to be delivered to the callers is not stored in any equipment of the telephone company, but rather is provided directly from the premises of the message creator. The telephone company equipment rather creates as many copies of the message signal as are needed to satisfy the instant number of callers who wish to receive the message. By virtue of this direct 1-to-N message delivery system, the message creator has complete control over the message signal and can, for example, supply repetitions of a brief message or a continuous live program. This message may be in the form of a voice announcement or data information.

The same announcement system also includes means for generating user statistics, such as by recording the number of orders and the types of orders as they are received, and also includes a billing system for automatically correlating the order calls with the identity of the telephone service lines which were used for making the order call. This permits the charge for the service to be billed in the same manner as the billing for the telephone service, and in some cases means that the charge for the announcement order may be added as an item to the telephone service bill. Because such procedures are presently well known and widely used, they will not be discussed in further detail herein, except with regard to advantages that may accrue as a result of their function within the system 10.

The interconnections of the program producer 12, the TV network 14, the broadcast station 16, and the subscriber unit 18 by the telecommunications network 20 are accomplished by any of the commonly used signal carrier media, or combinations thereof, which are suitable for the type of signal carried. Communications carriers presently provide a wide range of services appropriate for connections between producers, television networks, and broadcast stations. They also provide a telephone service line, usually in the form of metal wire, to subscribers who have telephone service. Therefore, the nature of the interconnection equipment to be used in conjunction with this invention will also not be discussed in detail herein except with regard to advantages that may accrue as a result of their function within the system 10.

The producer 12 is assumed to be the original source of the signal which is to be offered as a program signal for viewing by subscribers on their own receiving equipment. The program signal from the producer 12 is forwarded to the network entity 14, which determines further distribution of it to various broadcast stations which are geographically distributed to permit wide dissemination of the program signal. The broadcast stations 16 send the program signal to the subscriber unit 18 of each subscriber by airwaves, cable (CATV), direct broadcast satellite (DBS), or some other suitable program signal carrier. In the system 10 of FIG. 1, the program signal carrier is represented by electromagnetic radiation 23. It is picked up at the subscriber location by an antenna 24 and carried to the subscriber unit 18 by leads 26. In some applications, such as in DBS or CATV, there may be signal conversion equipment, filters, amplifiers, or such between the antenna 24 and the subscriber unit 18, with appropriate leads 26 connecting such devices. The subscriber unit 18 may be receiving several different program signals associated with different frequency channels. One or more of these signals may be in enciphered form, while others may by not be enciphered and may therefore be available to the general public without charge.

The subscriber unit 18 is connected to the communications carrier network 20 by telephone lines 28. These lines 28 do not need to be dedicated lines. That is, they need not be used exclusively for the functioning of the subscriber unit 18, but rather may be the common telephone service lines of a typical residence with only one telephone service. This is a particularly important aspect of the invention, since the telephone company's knowledge of the subscriber's telephone line number permits proper billing without the necessity of identifying the subscriber unit 18 itself.

The subscriber unit 18 is connected to the television receiver 30 of the subscriber by signal leads 32.

It is a feature of the system 10 that the program signals transmitted by the program signal carrier 23 are accompanied by auxiliary signals carried within the retrace interval of the signal. Techniques for carrying information within the retrace interval of a television signal are well known in the television broadcast art. The auxiliary signals include control and display signals in the form of low speed digital information.

FIGS. 2 and 3 show the subscriber unit 18 of FIG. 1 in greater detail. FIG. 2 shows the front of the unit 18. On the extreme left there is located an on-off power switch 36 which may control the power to the subscriber unit 18 alone or also control the power to the receiver 34. To the right of the switch 36 there is an order call button 38 by which the subscriber can command the unit 18 to order a desired program. Next to this is a channel selection switch 40. A rectangular electronic alphanumeric display panel 42 is provided for displaying program and ordering information. On one side of the unit 18 is a mechanical lock 44 by which the unit 18 may be disabled to prevent unauthorized use.

FIG. 3 shows the back of the unit 18 with various electrical connection means including program signal output terminals 46 by which the program signal passes to the receiver 34, program signal input terminals 48 by which the signals picked up by the antenna 24 are received through the leads 26, an auxiliary power receptacle 50 by which the receiving equipment power can be controlled by the unit 18, a power input plug 52 by which line power is supplied to the unit 18, and a pair of telephone jacks 54,56. The jack 56 is suited for an extension telephone. The jack 54 is coupled directly to a telephone service.

In the operation of system 10, it is first assumed that the unit 18 is supplied with power. The auxiliary signals will supply program information which will appear on the display 42 to advise the subscriber as to the availability and time of an offered program. It may also give the cost to the subscriber. In order for this information to appear on the display 42, however, it is necessary that the channel selection switch 40 be in the position for receiving the signal channel associated with the offered program. Each of the available channels may have such display information provided with its program signals, so that this display information may be selected by the subscriber as desired by appropriate positioning of the channel selection switch 40.

If the subscriber wishes to order a program being offered, he need only operate the order call button 38 within the time period specified by the displayed information. This will initiate an order sequence within the unit 18 by which there will subsequently be an automatic call to the announcement distribution system 21 of the telecommunications network 20. The call will be triggered by an appropriate control message provided in the auxiliary signal. The announcement distribution system 21 will recognize from the telephone number which was called by the unit 18 that this call requires a particular order response. It will then make that response by automatically connecting the call from the unit 18 to an announcement in the form of a low speed voiceband data signal which contains a deciphering key.

An example of a deciphering key is shown schematically in FIG. 4. It consists of a continuously repeated data message 58 which is 3 seconds long. The length is chosen for compatibility with the prevailing telecommunications network standards for validating the call. The key information is in the form of a number of digitally encoded numerical values which can be used to set the coefficients of a signal filter. It is noted that since the amount of information ordinarily needed for deciphering can be transmitted within only a fraction of the three second interval, there remains a considerable amount of time which may be used to transmit other information to the unit 18. This may be display information or operational control information for the unit 18 similar to that contained in the auxiliary signal.

As the unit 18 receives the deciphering key information, it stores the key within a memory associated with the selected program channel. Now the unit 18 is prepared to decipher the program signal on command at the time it is delivered to the unit 18. At the start of the program, the control signals which are in the auxiliary signal delivered with the program will instruct the deciphering circuitry to become active. The activating instructions will continue throughout the program. A later program will have a different enciphering format and will therefore require a different key. Thus, although the later program also carries with it the control signals for activating the deciphering circuitry, this will be insufficient for the deciphering process, since the unit 18 will not have in its memory the key information necessary for the deciphering.

There are a large number of enciphering methods known in the art which would readily lend themselves to the system 10. The particular one chosen depends upon the chosen complexity of the unit 18 and the enciphering equipment, as well as upon the nature of the particular signal to be transmitted. The preferred type of enciphering for use with the system 10 is one in which a digitally encoded key can be used to correctly set the coefficients of a deciphering circuit signal filter in the unit 18 for deciphering. Various enciphering techniques of this type are known to those in the art of enciphering television signals and can be readily adapted by them for the system 10. Therefore, the structural details of the deciphering circuitry necessary for this are not discussed in detail here.

The order calling apparatus of the unit 18 includes a memory in which an order call instruction from the subscriber is held until such time as the unit 18 receives a proper deciphering key when it calls the announcement distribution system. Any other call result, such as a busy signal, will cause the unit 18 to retain the order call instruction in memory. It is further provided with means responsive to the control signals of the auxiliary signals carried with the program signal by which its call initiation is determined to be within a particular time period as determined by overload sensing equipment of the announcement distribution system. These features, described below, are especially advantageous for situations in which there is a high degree of impulse ordering.

FIG. 5 illustrates graphically the problems which arise with impulse ordering of program signals. The baseline 60 represents the passage of time about the beginning time of the program signal. The ordinate represents the number of order events. Curve 62 shows the number of orders requested over time by subscribers who have operated the order call switch 38 on their units 18. Curve 64, on the other hand, shows the number of orders to which the announcement distribution system has been able to respond. It is seen that within the short interval between the end of a normal broadcast and the beginning of the ordered program signal there is an overload condition of the announcement distribution system. As discussed above, the unit 18 will continue to attempt to place the order if it encounters a busy signal in such an overload condition. However, the end result may be that in a severe overload situation the deciphering key information is not delivered by the time the program is to begin. This would leave the subscriber as having been billed for the program in its entirety while not being able to decipher it from its beginning point. In order to avoid such a state of affairs, the program signal can be initially transmitted with a first enciphering. Appropriate control signals delivered by auxiliary signals transmitted with it will enable any subscriber unit 18 to decipher the program signal by the use of deciphering key information which is already available to the unit 18, either by being hardwired within it, by being delivered at an earlier time, or by being delivered coincidentally with the control signal to switch to this first deciphering state. This deciphering state of the unit 18 will be referred to as the "internal key" state. The low speed data and control content of the auxiliary signal can also be used to put the unit 18 into a state in which the deciphering circuitry is not utilized, such as when the program signal is not enciphered because it is intended to be available to the general public. This will be referred to as the "bypass" state.

The probability of overloading of the order receiving equipment can be reduced by controlling the order calling of the subscriber units 18 in groups. The groups would be determined by internal identifiers. For example, the low speed data and control signals accompanying the program signal can include order call activation commands for the units in three different formats which are sufficiently spaced in time to accommodate the order demand which is expected for the program. The units would be provided with corresponding filters by groups, so that a given call activation command will activate only that group which has a pass-filter for that signal. The others would remain in a standby condition until activated by their respective control signals. In this manner, the order taking capacity of the system is most effectively used. Furthermore, the time period allotted for the order calling of the groups of units 18 can be adjusted as needed as the orders are taken, due to the availability of the user statistics kept by the stored program control system 22.

There are, then, three signal receiving states of the unit 18. The first is the bypass state, in which the deciphering circuitry is inactive and the program signal is transmitted unaltered to the receiver 34. The second is the internal key state, in which the unit 18 deciphers the enciphered program signal with the use of internally available deciphering key information. As described above, this state can be used if the order call button 38 has been operated and the key information has not been delivered by the time the program has started. The third is the ordered key state, in which the program signal is deciphered using key information delivered in response to an order call for that program.

Figure 6:
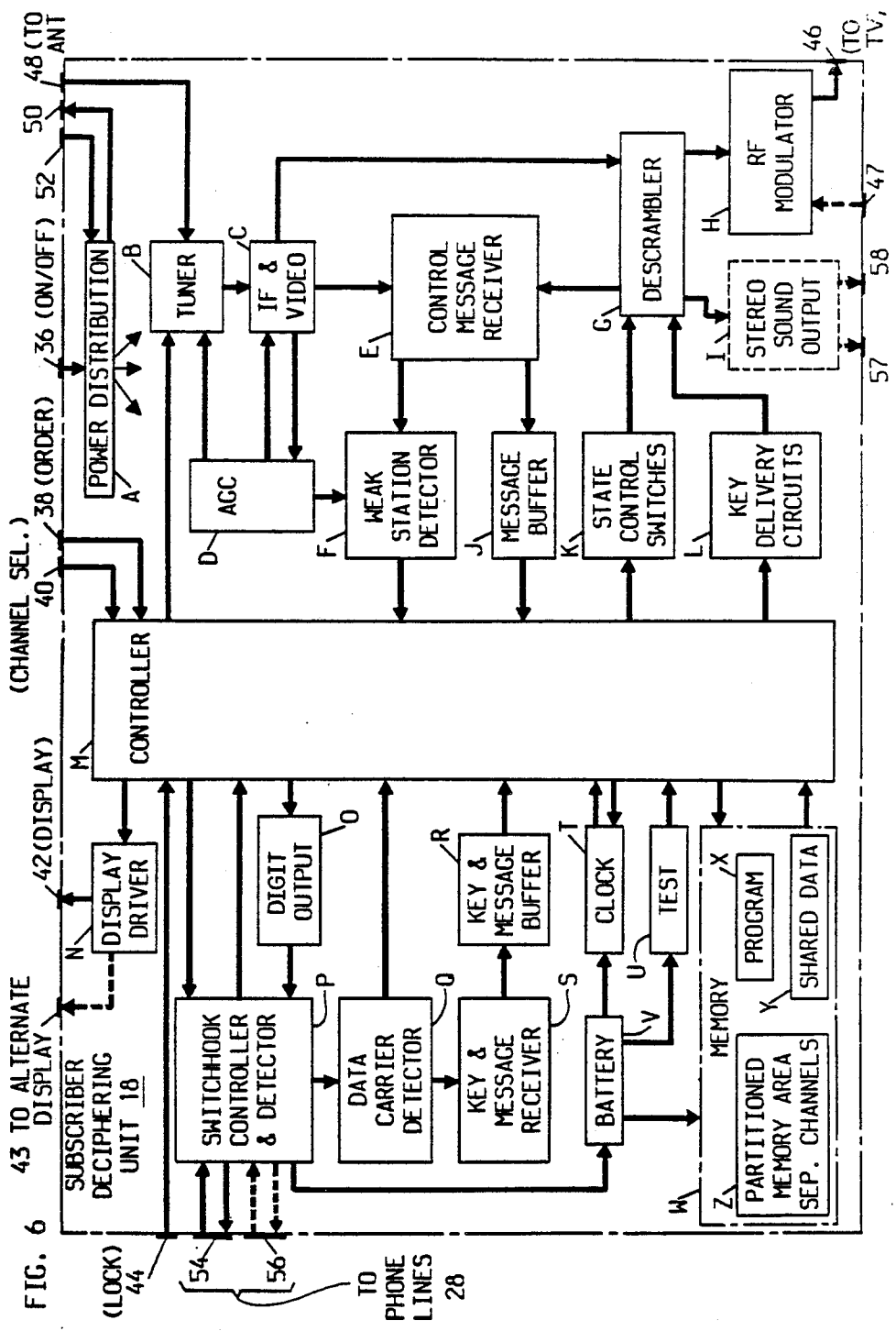
FIG. 6 is a functional block circuit diagram of the subscriber unit of FIGS. 2 and 3.

FIG. 6 is a partially pictorial functional block diagram of the subscriber unit 18. The subunits A-L illustrated on the right side of the unit are largely concerned with the reception and deciphering of the television signal, while the subunits N-Z on the left side are largely concerned with the telephone connection and the reception and processing of the deciphering key and related messages. The functional details of the subunits can be readily supplied by those skilled in the art.

Power is delivered throughout by a power supply subunit A under the control of the switch 36. Subunits B, C and D provide standard television receiver functions of tuning, IF and Video amplification, and automatic gain control. Subunit B is an electronic tuner; it receives channel changes indirectly via controller M, rather than directly from the channel selector 40, as would be the case with a mechanical tuner.

The receiver subunit E takes the output of the amplifier C and extracts auxiliary signals from those retrace interval lines which have subscription television header signals. These auxiliary signals are formated into control messages and then output to the message buffer J for use by the controller submit M.

The control message receiver E reports message format and parity errors to the weak station detector F, which measures both the AGC output level and the message error rate to determine if a weak station condition must be reported to the controller M.

It is the principal function of the tuner B and the amplifier C to prepare the television signal as it appears at input 48 for deciphering circuitry in the form of a descrambler G. The descrambler G has two sets of input leads controlling its operation: first, those from the state control switches as set by subunit K; and second, the deciphering key inputs as delivered by the key delivery subunit L. The circuits within descrambler G are set to either bypass or use the descrambling logic upon command from the state control switch K. The descrambler G resets to the bypass state whenever it is not receiving power from subunit A.

The deciphering key is delivered to the descrambler G to cause it to operate in the proper mode and with the proper timing for deciphering the television signal. The deciphered signal is delivered to the RF modulator subunit H for conversion to a proper signal for use by the subscriber's television receiver 30. An adjustment 47 is provided for the subunit H to set the output channel, typically to VHF channel 3 or 4. A portion of the deciphered signal is also delivered to an optional subunit I, which separates and amplifies stereo sound output signals and delivers those signals to the optional ports 57 and 58 for connection into the subscriber's sound system. In addition, the descrambler G output is in part delivered to the control message receiver E for purposes of receiving enciphered control messages and thereby testing the performance of the descrambler G.

The controller M receives signals of changes of condition within unit 18, and then responds by taking the appropriate action as determined by its associated programs. For example, the controller M may be alerted to an arriving message by subunit J; that message may be a "display text" message. Controller M will then use its display programs to convert the message data to display data for output to the display driver subunit N. The display driver N then creates the appropriate text on the external display panel 42 and also on the auxiliary data output port 43.

The controller M notes the position of lock 44 whenever the subscriber activates the order call button 38 or the channel select switch 40. Lock 44 can thus be used to prevent the ordering of any program signals, i.e., the unit 18 must be "unlocked" to allow program signals to be ordered. Similarly, lock 44 can be used to enable or disable program viewing on certain program channels. The subscriber enables the desired channels by placing lock 44 in a "channel enable" position and using the channel selection switch 40. Controller M will cause the display 42 to indicate the channel numbers and their enabled/disabled state in response to the subscriber selections.

The switchhook controller and detector P and the digit output subunit O provide the autodialer function for the unit 18. Subunit P determines and controls the busy/idle state of the subscriber's telephone line to allow unit 18 to place telephone calls without interrupting normal telephone usage. Subunit O transmits the digits of the telephone number desired.

The data carrier detector Q, the key and message buffer R, and the key and message receiver S together create the receive portion of a low-speed data modem. The controller M, after placing a call for a deciphering key, will await a signal from data carrier detector Q indicating that the call indeed did reach the intended destination. If that signal is not received within the proper time interval as set by a control message and timed by the clock subunit T, then the controller M will abandon the call attempt. If the call is completed, then the controller M will await the key and other messages to be delivered via subunits S and R. Should subunit S not receive an appropriate key signal, then the controller M will again consider the call to be incomplete.

The controller M, the memory W, and the clock T are preferably supplied with back-up (battery) power V: Back-up power is supplied to the controller M via a power test subunit U which alerts the controller of low battery condition. Power to restore the battery is delivered from subunit A when the unit 18 is ON, and from subunit P when it is OFF.

The memory subunit W provides both RAM and ROM functions. The program subunit X contains the programs and permanent data, such as a unit serial number, needed for operations of unit 18. The shared data subunit Y stores transient data such as switchhook busy/idle state, which can be considered as shared by any and all program channels. This is to be contrasted with the data stored in the partitioned memory area Z, such as the telephone number to be called to subscribe to a forthcoming program. Controller M assigns areas within memory Z based on the appearance of control messages in message buffer J whenever a channel selector 40 change is made by the subscriber. All data pertaining to orders for programs is kept segregated by channel within memory Z.

Preferably, each channel that is enabled and transmitting a control signal is allocated a section of the memory Z by the unit 18 when it notes the presence of both the enabling and the control signals. There is no cross access within memory Z between broadcasting stations. Moreover, each channel has memory in areas accessible only to commands received in the auxiliary signal or via the telephone line, respectively.

GENERAL CONSIDERATIONS

The key information which is delivered via the telephone may itself be enciphered. This might be done by, for example, disguising the key data within a much longer data signal that is largely chaff, using some numerical substitution scheme, or using any arithmetic operation that is reversible. The key would be deciphered or simply sorted from the chaff by using other data available to the descrambler G before or during the ordered program. Such data might be any of:

(1) data sent in the control signal coincident with the key data (a "good/bad" control pattern matching or other deciphering signal);

(2) data as in (1), but sent via control signal at an earlier or later time;

(3) data permanently stored in the box (such as a protected identifying number, where "protected" means not known to the subscriber);

(4) data sent earlier or later via telephone in the same or different telephone call, such as for a down payment/final payment scheme, or for a discount plan for heavy users; or, (5) some combination of these methods. A major advantage of this system is the ability of each television network to create a desired variation of key delivery scheme using techniques such as described here. This is possible because each network supplies its own control signals and telephone signals and can use these signals to specify the sequences of operations performed by the descrambler G in real time.

This system can be of advantage also to networks which choose not to broadcast their programs on a pay basis. These networks can still display messages on the unit 18 if the program signal carries the appropriate auxiliary signals containing display messages with it.

The order calling procedure of this system can be used to poll subscribers to obtain their answers to questions appearing on the display 42 of the unit 18 or presented in a program being viewed.

The system 10 above is one specific example of the present invention. It will be evident from the various observations below that a person of ordinary skill in the art may make many modifications in the system 10 without departing from the spirit of the invention.

The program signal is not limited to one of a particular frequency or carried by a particular medium. It may be a television, radio, or other frequency signal. The enciphering scheme may take any appropriate form which is suitable for the transmission of a separate deciphering key in the form of an electronically transmitted message capable of being stored in the subscriber unit. The program signal need be accompanied only by a control signal for activating the deciphering. The display data signal is optional. The accompanying control signal may be transmitted to the subscriber unit in any suitable form so long as it bears an appropriate time relationship with the program signal to permit the activation of the deciphering contemporaneously with the starting period of the program. While it is convenient to carry the control signal on the same channel with the program signal, this is not essential, and the control signal can be supplied by other carrier means if that is preferable.

The mass announcement distribution feature of the system 10 is described because such a feature is presently in operation in the telephone system of the United States. Any telecommunications network feature which is capable of responding to an order call with a deciphering key and of doing so in a short enough time to meet the demand for program orders to an acceptable degree would be suitable. For example, an electronically programmable private branch exchange (PBX) can be adapted to perform such a function.

The manual lock on the subscriber unit can deny program orders while neither denying viewing nor canceling orders already placed. Under certain circumstances it may be desirable to equip the subscriber unit with a mechanism for disabling the ordering capability if the unit senses that the program signal from the program channel is too weak to yield an acceptable rendition of the program or would be likely to result in errors in the control signals. The unit may also include a memory for recording the lengths of time that an unsatisfactory signal is received. This information can be automatically accessed at a future time and used by the television network to control future ordering or possibly as the basis for a refund.

The information for display can appear on the television screen in the "caption" area at the top or bottom of the screen instead of on the subscriber unit. The display on the unit or otherwise external of the television picture can take various forms. It may, for example, be by a printing mechanism connected to the subscriber unit as slave.

The memory of the subscriber unit is preferably of the type which retains stored information without external power. This permits a subscriber unit to be provided with deciphering key information and then transported to another location for receiving the program. This would make possible the renting of such units already provided with the key information for a given time or program.

The connection of the subscriber unit to the telephone service can be adapted to be cordless. Also, the unit may be provided with a handset and dial mechanism for use as a telephone.

What is claimed is:

1. Electronic apparatus of the type comprising:

means for receiving a program signal in an enciphered form from a signal carrier;

means requiring a predetermined deciphering key for selectively deciphering the program signal and sending it to a receiver instrument, means for controlling the activation of the deciphering means;

means for storing an external request to order said program signal;

means operative subsequent to receipt of said order for establishing a telephone connection to a predetermined telephone service number associated with a central ordering facility contained within a public switched telephone network and for receiving from said central ordering facility via said telephone connection said predetermined deciphering key, and means responsive to receipt of an activation signal delivered subsequently with said enciphered program signal for activating said means for deciphering.

2. The apparatus defined in claim 1 comprising means for selectively permitting a nonenciphered program signal to bypass the deciphering means.

3. Electronic apparatus of the type comprising means for receiving a program signal in an enciphered form from a signal carrier, means requiring a predetermined deciphering key for selectively deciphering the program signal and sending it to a receiver instrument, means for controlling the activation of the deciphering means, means for storing an external request to order said program signal, means operative subsequent to receipt of said order for establishing a telephone line connection to a predetermined telephone service number and for receiving from a central ordering facility connected to the other end of said telephone line connection said predetermined deciphering key, and means responsive to receipt of an activation signal delivered subsequently with said enciphered program signal for activating said means for deciphering, wherein said signal carrier also delivers an order control signal at a point in time subsequent to the occurrence of said external request, and wherein said apparatus further includes means responsive to receipt of said order control signal for enabling said means for establishing.

4. Electronic apparatus of the type comprising means for receiving a program signal in an enciphered form from a signal carrier, means requiring a predetermined deciphering key for selectively deciphering the program signal and sending it to a receiver instrument, means for controlling the activation of the deciphering means, means for storing an external request to order said program signal, means operative subsequent to receipt of said order for establishing a telephone line connection to a predetermined telephone service number and for receiving from a central ordering facility connected to the other end of said telephone line connection said predetermined deciphering key, means responsive to receipt of an activation signal delivered subsequently with said enciphered program signal for activating said means for deciphering, wherein said signal carrier also delivers an order control signal at a point in time subsequent to the occurrence of said external request, means responsive to receipt of said order control signal for enabling said means for establishing, and means for displaying information delivered by said order control signal for providing program and other information to a user of said apparatus.

5. Electronic apparatus of the type comprising, means for receiving a program signal in an enciphered form from a signal carrier, means requiring a predetermined deciphering key for selectively deciphering the program signal and sending it to a receiver instrument, means for controlling the activation of the deciphering means, means for storing an external request to order said program signal, means operative subsequent to receipt of said order for establishing a telephone connection to a predetermined telephone service number and for receiving from a central ordering facility connected to the other end of said telephone connection said predetermined deciphering key, and means responsive to receipt of an activation signal delivered subsequently with said enciphered program signal for activating said means for deciphering, wherein said program signal is received during an initial period of time in a form that is decipherable using an internal deciphering key and is received after said initial period of time in said enciphered form and wherein said means for deciphering uses said internal deciphering key during said initial period of time and uses said predetermined deciphering key after said initial period of time to decipher said program signal.

6. A method of controlling the acquisition of an enciphered program signal by at least one subscriber unit, said enciphered program signal being transmitted over a predetermined transmission path, said method comprising the steps of receiving an order call from said at least one subscriber unit via a telephone line, responding to said order call by returning over said telephone line a predetermined deciphering key without requiring said at least one subscriber unit to identify itself, and transmitting thereafter over said predetermined transmission path said enciphered program signal for receipt by said at least one subscriber unit, said program signal being transmitted during an initial period of time in a form decipherable by said least one subscriber unit using a priorly stored deciphering key and being transmitted after said initial period in a form decipherable using said predetermined deciphering key.

7. The method claim 6 further comprising the steps of transmitting said enciphered signal in a first form during an initial predetermined period of time and then transmitting it in a second enciphered form after said initial predetermined period of time, and transmitting with said enciphered signal first and second control signals, said first control signal being transmitted during said initial period of time and said second control signal being transmitted after said initial period of time, said first and second control signals causing said at least one subscriber unit to use an internal deciphering key to decipher said enciphered program signal when it is in said first form and to use said predetermined deciphering key when said program signal is in said second form, respectively.

8. An arrangement for controlling the acquisition of an enciphered program signal representative of a particular program, said enciphered program signal being of a predetermined duration and being transmitted to a plurality of subscriber units each having access to a priorly stored common deciphering key, said arrangement comprising means for returning to individual ones of said subscriber units who have requested receipt of said program signal a predetermined deciphering key operable for deciphering said enciphered program signal, said predetermined duration comprising at least two predefined intervals of time, and means thereafter operative during a first one of said at least two predefined intervals for transmitting said program signal in a form that is decipherable using said common deciphering key and operative during a succeeding second one of said at least two predefined intervals for transmitting said program signal in a form that is decipherable using said predetermined deciphering key.

9. The arrangement set forth in claim 8 wherein a first control signal is transmitted with said program signal during said first one of said at least two predefined intervals and a second control signal is transmitted with said program signal during said succeeding second one of said at least two predefined intervals, said first and second control signals being operative for causing said subscriber units receiving said program signal to decipher it using said common deciphering key and said predetermined deciphering key, respectively.

10. An arrangement for controlling the acquisition of an enciphered program signal that is transmitted to a plurality of subscriber units each having access to a priorly stored deciphering key, said arrangement comprising means for returning to individual ones of said subscriber units who have requested receipt of said program signal a predetermined deciphering key operable for deciphering said enciphered program signal, and means thereafter operative for transmitting said program signal during an initial predetermined period of time in a form that is decipherable using said priorly stored deciphering key and transmitting said program signal after said initial predetermined period of time in a form that is decipherable using said predetermined deciphering key, wherein individual ones of said plurality of subscriber units form respective groups of subscriber units, and wherein said arrangement further comprises means for controlling when each of said groups of subscriber units initiate their request for said program signal.

11. In combination a distribution system contained within a public switched telephone network, said system being responsive to receipt of a telephone call established over a telephone line connection for returning over said telephone line a predetermined deciphering key and for billing the recipient of said predetermined deciphering key at the time of said telephone call, said predetermined deciphering key being stored in said system and being operative for deciphering a respective enciphered program signal, a central transmitting facility for subsequently transmitting over a predetermined transmission path said enciphered program signal, and a subscriber unit comprising, means responsive to an external request directed to ordering said program signal for establishing said telephone line connection and for receiving from said distribution system said predetermined deciphering key, and means thereafter responsive to receipt of said enciphered program signal over said predetermined transmission path for deciphering said program signal using said predetermined deciphering key.

* * * * *